United States Patent
Wang et al.

(10) Patent No.: US 9,667,948 B2
(45) Date of Patent: May 30, 2017

(54) METHOD AND SYSTEM FOR PROVIDING THREE-DIMENSIONAL (3D) DISPLAY OF TWO-DIMENSIONAL (2D) INFORMATION

(71) Applicants: Ray Wang, McLean, VA (US); Borwyn Anne Wang, McLean, VA (US); Andrew Wang, McLean, VA (US)

(72) Inventors: Ray Wang, McLean, VA (US); Borwyn Anne Wang, McLean, VA (US); Andrew Wang, McLean, VA (US)

( * ) Notice: Subject to any disclaimer, the term of this patent is extended or adjusted under 35 U.S.C. 154(b) by 156 days.

(21) Appl. No.: 14/522,763

(22) Filed: Oct. 24, 2014

(65) Prior Publication Data

US 2015/0116465 A1 Apr. 30, 2015

Related U.S. Application Data

(60) Provisional application No. 61/896,456, filed on Oct. 28, 2013.

(51) Int. Cl.
*H04N 13/04* (2006.01)
*H04N 13/00* (2006.01)

(52) U.S. Cl.
CPC ......... *H04N 13/04* (2013.01); *H04N 13/0059* (2013.01); *H04N 2213/006* (2013.01)

(58) Field of Classification Search
CPC ............... H04N 13/04; H04N 13/0059; H04N 2213/006
USPC .......................................................... 348/51
See application file for complete search history.

(56) References Cited

U.S. PATENT DOCUMENTS

| | | | |
|---|---|---|---|
| 7,423,650 B2 | 9/2008 | Lee et al. |
| 7,586,888 B2 | 9/2009 | Wang |
| 7,630,736 B2 | 12/2009 | Wang |
| 7,728,789 B2 | 6/2010 | Jung et al. |
| 7,801,058 B2 | 9/2010 | Wang |
| 8,264,589 B2 | 9/2012 | Fukushima |
| 8,294,753 B2 | 10/2012 | Jeong et al. |
| 8,305,935 B2 | 11/2012 | Wang |
| 8,305,936 B2 | 11/2012 | Wang |
| 8,345,956 B2 | 1/2013 | Ward |
| 8,411,590 B2 | 4/2013 | Wang |
| 8,427,979 B1 | 4/2013 | Wang |

(Continued)

*Primary Examiner* — William C Vaughn, Jr.
*Assistant Examiner* — Jae N Noh
(74) *Attorney, Agent, or Firm* — Lesavich High-Tech Law Group, S.C.; Stephen Lesavich

(57) ABSTRACT

A method and system for providing a three-dimensional (3D) display. A variable length z-axis is added to each of plural (x,y) cells in a two-dimensional (2D) Cartesian plane creating plural three-dimensional (3D) cells each with a x, y and z axis. The z-axis includes a variable length light source for each of the plural x-y cells. The z-axis also includes a space vector including time and space information. A $3^{rd}$ dimension is created by changing a length of the light source. A 2D image cell at (x, y) is moved along the 3D z-axis (x, y, $z_\alpha$) with viewing angle ($\alpha$) to create a converted 3D image. An original 2D image adding z-axis with a space vector can be viewed as a 3D image on any network device (e.g., smart phone, tablet, wearable device, TV, etc.) without additional devices such as 3D glasses, 3D set-top boxes, etc.

20 Claims, 9 Drawing Sheets

(56) References Cited

U.S. PATENT DOCUMENTS

| | | |
|---|---|---|
| 8,463,765 B2 | 6/2013 | Lesavich |
| 8,605,136 B2 | 12/2013 | Yu |
| 8,659,592 B2 | 2/2014 | Wang et al. |
| 8,730,232 B2 | 5/2014 | Passmore |
| 8,743,178 B2 | 6/2014 | Filippini et al. |
| 8,836,692 B2 | 9/2014 | Kim et al. |
| 8,836,761 B2 | 9/2014 | Wang et al. |
| 8,842,905 B2 | 9/2014 | Hsieh et al. |
| 8,956,298 B2 | 2/2015 | Lee et al. |
| 8,982,185 B1 | 3/2015 | Shastri et al. |
| 9,037,564 B2 | 5/2015 | Lesavich et al. |
| 9,137,250 B2 | 9/2015 | Lesavich et al. |
| 9,361,479 B2 | 6/2016 | Lesavich et al. |
| 9,390,284 B1 | 7/2016 | Wang et al. |
| 2003/0053513 A1 | 3/2003 | Vatan |
| 2006/0182076 A1 | 8/2006 | Wang |
| 2006/0290888 A1 | 12/2006 | Jung et al. |
| 2007/0090996 A1 | 4/2007 | Wang |
| 2007/0132765 A1 | 6/2007 | Lee et al. |
| 2008/0007566 A1 | 1/2008 | Park et al. |
| 2008/0025330 A1 | 1/2008 | Wang |
| 2009/0189739 A1 | 7/2009 | Wang |
| 2009/0219289 A1 | 9/2009 | Kalvin |
| 2010/0111417 A1 | 5/2010 | Ward et al. |
| 2010/0238264 A1 | 9/2010 | Liu et al. |
| 2010/0309361 A1 | 12/2010 | Fukushima |
| 2011/0019587 A1 | 1/2011 | Wang |
| 2011/0208710 A1 | 8/2011 | Lesavich |
| 2011/0210816 A1 | 9/2011 | Wang |
| 2011/0235627 A1 | 9/2011 | Wang |
| 2012/0075422 A1 | 3/2012 | Wang et al. |
| 2012/0278622 A1 | 11/2012 | Lesavich et al. |
| 2013/0083162 A1 | 4/2013 | Wang et al. |
| 2013/0114135 A1 | 5/2013 | Lin et al. |
| 2013/0202191 A1 | 8/2013 | Wang |
| 2014/0002449 A1 | 1/2014 | Lu |
| 2014/0078263 A1 | 3/2014 | Kim |
| 2014/0125661 A1* | 5/2014 | Kurosaki ............ H04N 13/007 345/419 |
| 2014/0140576 A1* | 5/2014 | Ikeda ................... G06T 7/0022 382/103 |
| 2014/0189792 A1 | 7/2014 | Lesavich et al. |
| 2014/0300703 A1 | 10/2014 | Ito |
| 2015/0235414 A1* | 8/2015 | Zheng ................. H04N 13/026 345/420 |
| 2015/0263886 A1 | 9/2015 | Wang et al. |
| 2015/0379301 A1 | 12/2015 | Lesavich et al. |
| 2016/0321654 A1 | 11/2016 | Lesavich et al. |

\* cited by examiner

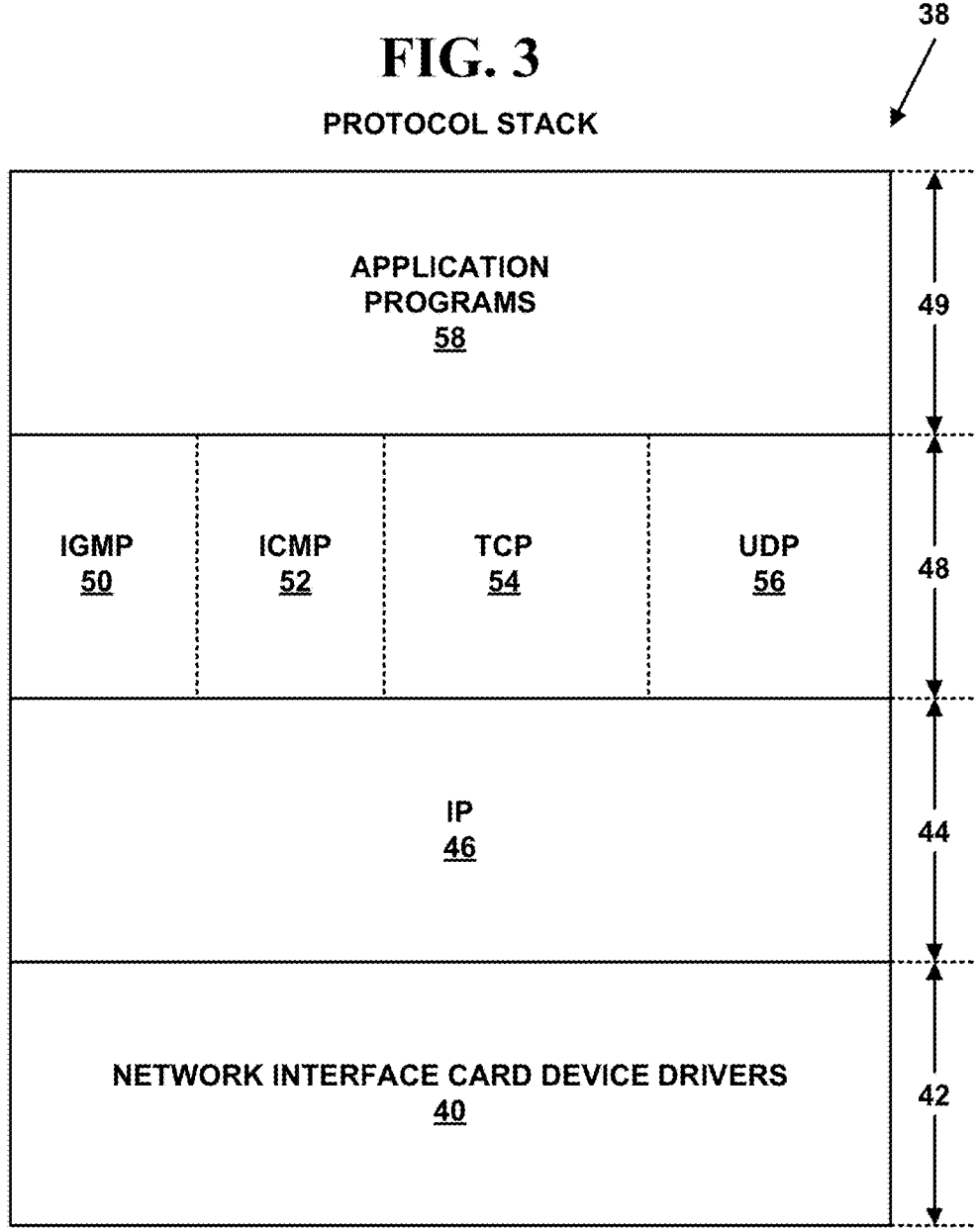

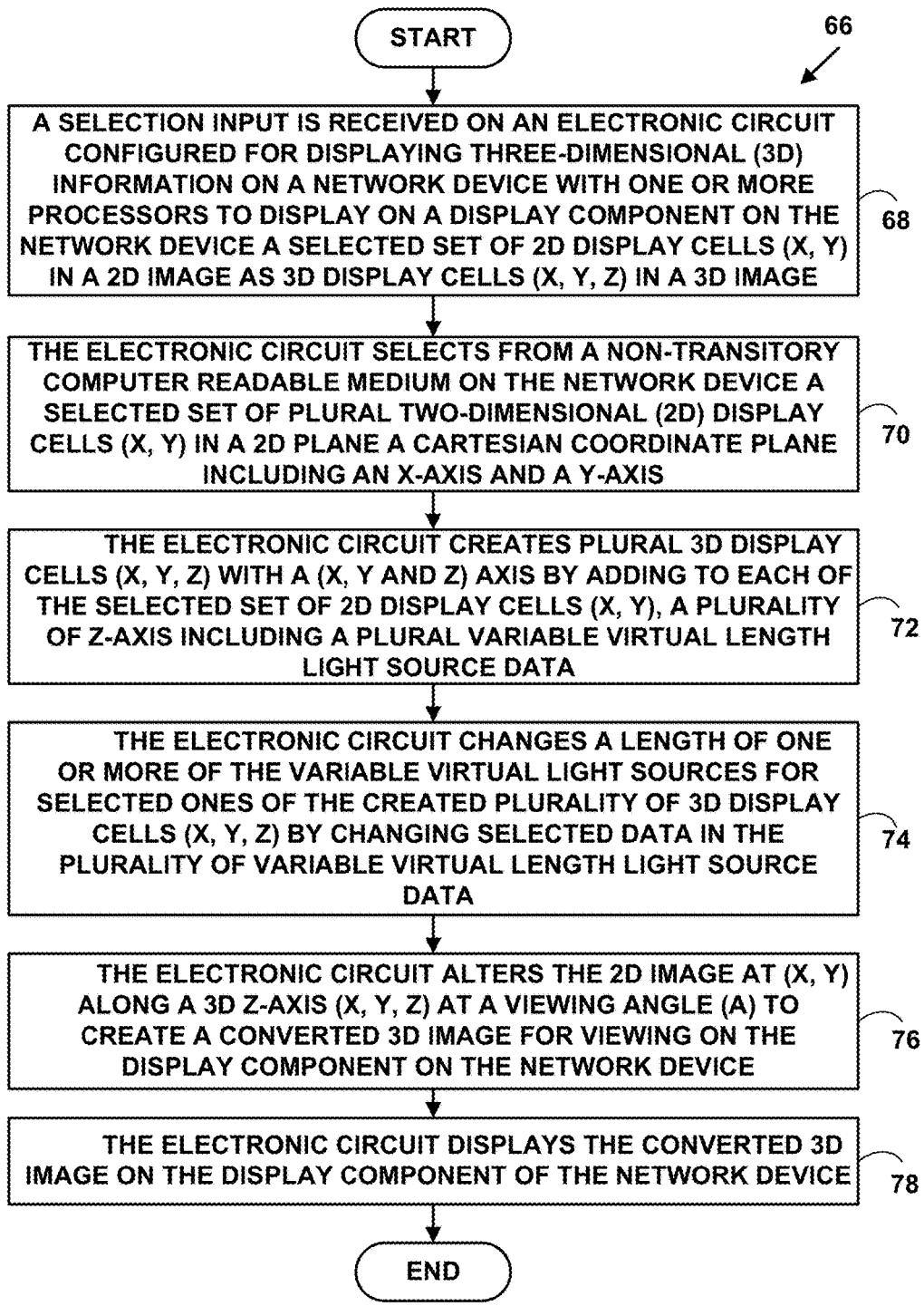

METHOD AND SYSTEM FOR PROVIDING THREE-DIMENSIONAL (3D) DISPLAY OF TWO-DIMENSIONAL (2D) INFORMATION

CROSS REFERENCES TO RELATED APPLICATIONS

This U.S. Utility patent application claims priority from U.S. Provisional Application No. 61/896,456, filed on Oct. 28, 2013, the contents of which are incorporated by reference.

FIELD OF INVENTION

This invention relates to providing display of electronic information. More specifically, it relates to a method and system for providing three-dimensional (3D) display of two-dimensional (2D) information.

BACKGROUND OF THE INVENTION

Displays on movie screens, televisions, portable and non-portable game platforms, laptops, smart phones, tablets and wearable devices with display are capable of displaying three-dimensional (3D) electronic content.

Wearable devices are becoming more popular and are also capable of display 3D electronic content. The calculator watch, introduced in the 1980s, was one of the original wearable devices. A few other examples includes a Bluetooth headset in a pair of earrings with a hidden microphone, a "Spy Tie" with a color video camera, a "Pocket Tweet" with a Java application applying a TWITTER text bubble to a person's shirt with Tweets, ZED-phones stitched headphones into beanies and headbands allowing riders, snowboarders, drivers and runners to stay connected, hands-free, etc.

Wearable technology has applications in monitoring and real-time feedback for athletes as well. Transitioning to night life and entertainment industries electroluminescent shirts have appeared in concerts SONY developed a "smart wig" This "Smartwig" includes a Global Positioning System (GPS), a camera and a laser pointer system and connects to other devices.

The digital glasses, such as GOOGLE Glass, include prototypes for digital eyewear with heads up display (HUD) are being developed. The US military also employs headgear with displays for soldiers using a technology called holographic optics.

Smart watches by SONY, NIKE, SAMSUNG, and others are additional examples. ABI Research forecasts about 1.2 million smart watches will be shipped in 2013 due to high penetration of smart phones in many world markets, the wide availability and low cost of MicroElectroMechanical Systems (MEMS) sensors, energy efficient connectivity technologies such as Bluetooth 4.0, and a flourishing app ecosystem.

According to ABI Research, due to the relative ease of compatibility with smart phones and other electronic devices, the wearable technologies market will likely spike to about 485 million annual device shipments by 2018.

Most 3D displays create the illusion of depth by presenting a different image to each eye through 3D glasses such as "filtered lenses" and "active shutter glasses." In addition to wearing glasses, neither method is suitable for long-duration viewing.

"Filtered lenses" 3D viewing creates an image where part goes to one eye and part to another, and part to both. One problem with this method is the color perception variety; it's extremely hard to balance colors so that a viewer's brain takes the broken-up colors and assembles them correctly. Wearing "active-shutter glasses" has potential health hazards when operated by having each eye being completely blocked out thirty or sixty times per second.

"Autostereoscopic display" is another 3D method with one pixel or group of pixels has its light directed to one eye, and another group to the other. Because the placement of the slits and therefore the viewable angle of the affected lines of pixels is static, viewers must have their eyes in a certain place in order to perceive the effect. Too close or too far away and light begins to leak in from the other set of pixels, or the 3D illusion is destroyed otherwise.

In addition, with the current 3D TV, movie and game services, a 3D set top box/DVR is required in order to receive 3D programming. Consumers are charged with additional fees for using 3D setup box. Eliminating both 3D glasses and 3D set top box are both desirable for consumers.

Thus, it is desirable to solve some of the problems associated with displaying 2D information as 3D electronic content.

SUMMARY OF THE INVENTION

In accordance with preferred embodiments of the present invention, some of the problems associated displaying three-dimensional (3D) electronic contents are overcome. A method and system for providing a three-dimensional (3D) display of two-dimensional (2D) information is presented.

A variable length z-axis is added to each of plural (x,y) cells in a two-dimensional (2D) Cartesian plane creating plural three-dimensional (3D) cells each with a x, y and z axis. The z-axis includes a variable length light source for each of the plural x-y cells. The z-axis also includes a space vector including time and space information. A 3rd dimension is created by changing a length of the light source. A 2D image cell at (x, y) is moved along the 3D z-axis (x, y, $z_\alpha$) with viewing angle ($\alpha$) to create a converted 3D image. An original 2D image adding z-axis with a space vector can be viewed as a 3D image on any network device (e.g., smart phone, tablet, wearable device, TV, etc.) without additional devices such as 3D glasses, 3D set-top boxes, etc.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 3 is a block diagram illustrating an exemplary networking protocol stack;

FIG. 5 is a flow diagram illustrating a method for 3D display;

DETAILED DESCRIPTION OF THE INVENTION

Figure 1:
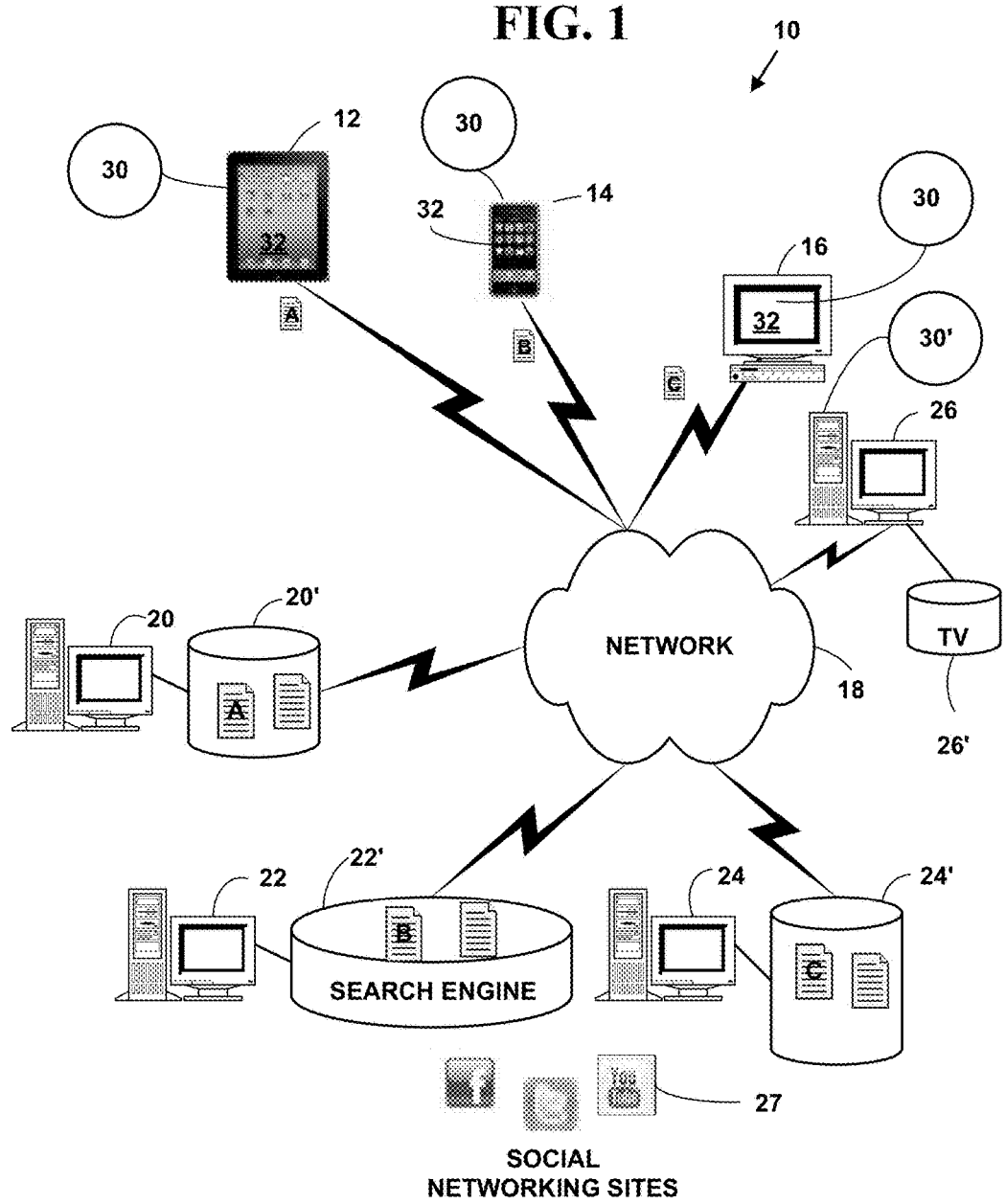
FIG. 1 is a block diagram illustrating an exemplary electronic information display system.

FIG. 1 is a block diagram illustrating an exemplary electronic information system 10. The exemplary electronic system 10 includes, but is not limited to, one or more target network devices 12, 14, 16 (only three of which are illustrated) each with one or more processors and a computer readable medium.

The one or more target network devices 12, 14, 16 include, but are not limited to, multimedia capable desktop and laptop computers, tablet computers, facsimile machines, mobile phones, non-mobile phones, smart phones, Internet phones, Internet appliances, wearable devices with display (e.g., smart watch, etc. See FIG. 8), personal digital/data assistants (PDA), two-way pagers, digital cameras, portable game consoles (Play Station Portable by Sony, Game Boy by Sony, Nintendo DSI, etc.), non-portable game consoles (Xbox by Microsoft, Play Station by Sony, Wii by Nintendo, etc.), cable television (CATV) set-top boxes, digital televisions including high definition television (HDTV), three-dimensional (3D) televisions, 3D printers and other types of network devices.

3D printers provide 3D printing or additive manufacturing (AM) and refer to any of the various processes for printing a 3D object. Primarily additive processes are used, in which successive layers of material are laid down under computer control. These objects can be of almost any shape or geometry, and are produced from a 3D model or other electronic data source. A 3D printer is a type of industrial robot.

The one or more smart network devices 12, 14, 16 also include smart phones such as the iPhone by Apple, Inc., Android phones such as Samsung Galaxy, Blackberry Storm and other Blackberry models by Research In Motion, Inc. (RIM), Droid by Motorola, Inc. HTC, Inc. other types of smart phones, etc. However, the present invention is not limited to such smart phone devices, and more, fewer or other devices can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers.

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance.

The one or more smart network devices 12, 14, 16 also include tablet computers such as the iPad, by Apple, Inc., the HP Tablet, by Hewlett Packard, Inc., the Playbook, by RIM, Inc., the Tablet, by Sony, Inc.

The target network devices 12, 14, 16 are in communications with a communications network 18 via one or more wired and/or wireless communications interfaces. The communications network 18 includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a computer readable medium include one or more associated databases 20', 22', 24', 26'. The plural network devices 20, 22, 24, 26 are in communications with the one or more target devices 12, 14, 16 via the communications network 18.

The plural server network devices 20, 22, 24 26, include, but are not limited to, World Wide Web servers, Internet servers, search engine servers 22, vertical search engine servers 22, social networking site 24, 27 servers, file servers, other types of electronic information servers, and other types of server network devices (e.g., edge servers, firewalls, routers, gateways, etc.).

The plural server network devices 20, 22, 24, 26 also include, but are not limited to, network servers used for computing providers, etc.

The communications network 18 includes, but is not limited to, a wired and/or wireless communications network comprising: the Internet, an intranet, a Local Area Network (LAN), a LAN (WiLAN), a Wide Area Network (WAN), a Metropolitan Area Network (MAN), a Public Switched Telephone Network (PSTN), a Cellular Network, a communications network 26 and other types of wired and/or wireless communications networks 18.

The communications network 18 may include one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, image processors, one or more memories and/or other types of computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Exemplary Information Display System

Figure 2:
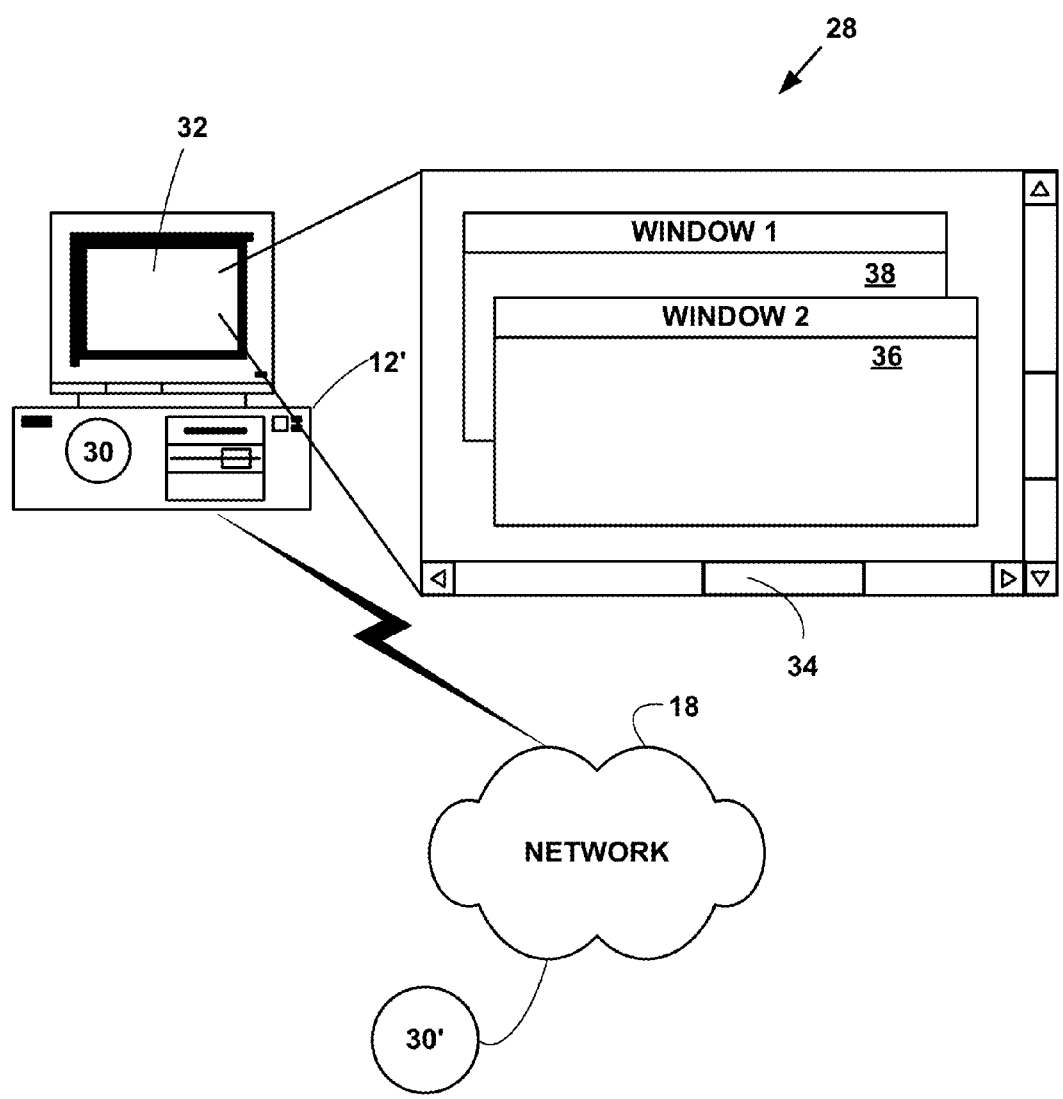
FIG. 2 is a block diagram illustrating an exemplary electronic information display system.

FIG. 2 is a block diagram illustrating an exemplary electronic information display system 28. The exemplary electronic information system display system includes, but is not limited to a target network device (e.g., computer 12', etc.) with an application 30 and a display component 32. The application 30, 30' presents a graphical user interface (GUI) 34 on the display 32 component. The GUI 32 presents a multi-window 36, 38, interface to a user.

In one embodiment of the invention, the application 30, 30' is a software application. However, the present invention is not limited to this embodiment and the application 30, 30' can be hardware, firmware, hardware and/or any combination thereof. In one embodiment, the application 30, 30' includes a three-dimensional (3D) viewing application. In another embodiment, the application 30 includes a smart phone application for a smart phone or a tablet computer. In another embodiment, the application 30, 30' includes a 3D printing application. However, the present invention is not limited these embodiments and other embodiments can be used to practice the invention In another embodiment, a portion of the application 30 is executing on the target network devices 12, 14, 16 and another portion of the application 30' is executing on the server network devices 20, 22, 24, 26 However, the present invention is not limited these embodiments and other embodiments can be used to practice the invention.

Exemplary Networking Protocol Stack

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layer. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 20, 22, 24, 26 are connected to the communication network 18 with Network Interface Card (NIC) device drivers 40 in a link layer 42 for the actual hardware connecting the network devices 12, 14, 16, 20, 22, 24, 26 to the communications network 18. For example, the NIC device drivers 40 may include a serial port device driver, a modem device driver, an Ethernet device driver, a wireless device driver, a wired device driver, etc. The device drivers interface with the actual hardware being used to connect the network devices to the communications network 18.

Above the link layer 42 is a network layer 44 (also called the Internet Layer for Internet Protocol suites). The network layer 44 includes, but is not limited to, an IP layer 46. As is known in the art, IP 46 is an addressing protocol designed to route traffic within a network or between networks. However, more fewer or other protocols can also be used in the network layer 44, and the present invention is not limited to IP 46.

Above network layer 44 is a transport layer 48. The transport layer 48 includes, but is not limited to, an optional Internet Group Management Protocol (IGMP) layer 50, an Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, and performance monitor, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 49 where application programs 60 (e.g., 30, etc.) to carry out desired functionality for a network device reside. For example, the application programs 30, 60 for the client network devices 12, 14, 16 may include a web-browsers or other application programs, application programs 62, while application programs for the server network devices 20, 22, 24, 26 may include other application programs (e.g., 30', etc.).

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for vertical searching. The NICs are connected to the plural server network devices 20, 22, 24, 26 and the communications network 18. However, the present invention is not limited to the NICs described and other types of NICs in other configurations and connections with and/or without a type of buses can also be used to practice the invention.

In one embodiment, network devices 12, 14, 16, 20, 22, 24, 26 and wired and wireless interfaces including the NICs include "4G" components. As is known in the art "4G" refers to the fourth generation of wireless communications standards and speeds of 100 megabits/second to gigabits/second or more. It is a successor to 3G and 2G standards. The nomenclature of the generations generally refers to a change in the fundamental nature of the service. The first was the move from analogue (1G) to digital (2G) transmission. This was followed by multi-media support, spread spectrum transmission and at least 200 kbits/second (3G). The 4G NICs include IP packet-switched NICs, wired and wireless ultra-broadband (i.e., gigabit speed) access NICs, Worldwide Interoperability for Microwave Access (Wi-MAX) NICs and multi-carrier transmission NICs. However, the present invention is not limited to this embodiment and 1G, 2G and 3G and/or any combination thereof, with or with 4G NICs can be used to practice the invention.

Wireless Interfaces

In one embodiment of the present invention, the wireless interfaces on network devices 12, 14, 16, 20, 22, 24, 26 include but are not limited to, 3G and/or 4G LTE or future cellular, IEEE 802.11a, 802.11b, 802.11g, 802.11n, 802.15.4 (ZigBee), Wireless Fidelity (Wi-Fi), Worldwide Interoperability for Microwave Access (WiMAX), ETSI High Performance Radio Metropolitan Area Network (HIPERMAN), RF Home, Machine to machine (M2M) and/or Near field communication (NFC) wireless interfaces. In another embodiment of the present invention, the wireless interface may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

As is known in the art, an 802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 M bps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

As is known in the art, Wi-Fi is a type of 802.11 xx interface, whether 802.11b, 802.11a, dual-band, etc. Wi-Fi devices include an RF interfaces such as 2.4 GHz for 802.11b or 802.11g and 5 GHz for 802.11a.

As is known in the art, 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

As is known in the art, WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

"Near field communication (NFC)" is a set of standards for smartphones and similar devices to establish radio communication with each other by touching them together or bringing them into close proximity, usually no more than a few centimeters. Present and anticipated applications include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as communications network 18.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN), Frame Relay Network, Asynchronous Transfer Mode (ATM) Network, and/or a cable television network (CATV) and/or satellite television networks (SATV) including HDTV that connect the network devices 12, 14, 16, 20, 22, 24, 26 via one or more twisted pairs of copper wires, digital subscriber lines (e.g. DSL, ADSL, VDSL, etc.) coaxial cable, fiber optic cable, power line, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Internet Television Services

In one embodiment, the 3D application 30, 30' provides television services 26 over the communications network 18. The television services 26 include Internet television, Web-TV, Apple TV, Google Chromecast, Comcast Xfinity, Netflix, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other mesh network device.

"Web-TV" delivers digital content via non-mesh broadband and mobile networks. The digital content is streamed to a viewer's set-top box, game console, computer, or other mesh network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television (CATV) formats.

However, the present invention is not limited to such Internet Television services and more, fewer and/or other Internet Television services can be used to practice the invention.

General Search Engine Services

In one embodiment, the 3D application 30, 30' provides general search engine services 22. A search engine is designed to search for information on a communications network 18 such as the Internet including World Wide Web servers, FTP servers etc. The search results are generally presented in a list of electronic results. The information may consist of web pages, images, electronic information, multimedia information, and other types of files. Some search engines also manage data available in databases or open directories. Unlike web directories, which are maintained by human editors, search engines typically operate algorithmically and/or are a mixture of algorithmic and human input.

In one embodiment, the 3D application provides general search engine services 22 as standalone services. In another embodiment, the 3D application 30, 30' provide general search engine services 22 by interacting with one or more other public search engines (e.g., GOOGLE, BING, YAHOO, etc.) and/or private search engine services.

However, the present invention is not limited to such general search engine services and more, fewer and/or other general search engine services can be used to practice the invention.

Social Networking Services

In one embodiment, the 3D application 30, 30' provides one more social networking services 24, 27 to/from one or more social networking web-sites (e.g., FACEBOOK, YOU-TUBE, TWITTER, MY-SPACE, PINTRIST, etc.). The social networking web-sites include, but are not limited to, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices and/or wired and wireless interfaces of the present invention include security and encryption for secure communications on the communications network 18 and/or communications network 26. Wireless Encryption Protocol (WEP) (also called "Wired Equivalent Privacy), Wi-Fi Protocol Access (WPA) and Wi-Fi Protocol Access II (WPA2) are security protocols for WLANs. WEP is cryptographic privacy algorithm, based on the Rivest Cipher 4 (RC4) encryption engine, used to provide confidentiality for 802.11b wireless data. WPA was the Wi-Fi Alliance's direct response and replacement to the increasing apparent vulnerabilities of the WEP standard. WPA has, as of 2006, been officially superseded by WPA2.

As is known in the art, RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WLAN security. It describes the encrypted transmission of data between systems 802.11x WLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

As is known in the art, DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

As is known in the art, RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

As is known in the art, "hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

As is known in the art, providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

As is known in the art, an Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

As is known in the art, Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

As is known in the art, the Hyper Text Transport Protocol (HTTP) Secure (HTTPs), is a standard for encrypted communications on the World Wide Web. HTTPS is actually just HTTP over a Secure Sockets Layer (SSL). For more information on HTTP, see IETF RFC-2616 incorporated herein by reference.

As is known in the art, the SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

As is known in the art, Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, Calif. is supplier of networking hardware and software, including router and security products.

However, the present invention is not limited to such security and encryption methods and more, fewer and/or other types of security and encryption methods can be used to practice the invention.

Three Dimensional (3D) Display of (2D) Information

Three-dimensional display (3D) conveys depth perception to the viewer by employing techniques such as stereoscopic display, multi-view display, 2D-plus-depth, or any other form of 3D display. Most modern 3D displays use an "active shutter 3D system" or a polarized 3D system, and some are autostereoscopic without the need of glasses.

The basic technique of stereo displays is to present offset images that are displayed separately to the left and right eye. Both of these 2D offset images are then combined in the brain to give the perception of 3D depth. Although the term "3D" is ubiquitously used, it is important to note that presentation of dual 2D images is distinctly different from displaying an image in three full dimensions. The most notable difference to real 3D displays is that the observer's head and eyes movements will not increase information about the 3-dimensional objects being displayed.

For example holographic displays do not have such limitations. Similar to how in sound reproduction it is not possible to recreate a full 3-dimensional sound field merely with two stereophonic speakers, it is likewise an overstatement of capability to refer to dual 2D images as being "3D". The accurate term "stereoscopic" is more cumbersome than the common misnomer "3D", which has been entrenched after many decades of unquestioned misuse. It is to note that although most stereoscopic displays do not qualify as real 3D display, all real 3D display are also stereoscopic displays because they meet the lower criteria as well.

An active shutter 3D system (e.g., alternate frame sequencing, alternate image, AI, alternating field, field sequential or eclipse method, etc.) is a technique of displaying stereoscopic 3D images. It works by openly presenting the image intended for the left eye while blocking the right eye's view, then presenting the right-eye image while blocking the left eye, and repeating this so rapidly that the interruptions do not interfere with the perceived fusion of the two images into a single 3D image.

Active shutter 3D systems generally use liquid crystal shutter glasses (also called "LCS glasses", "LCS 3D glasses", "LC shutter glasses" or "active shutter glasses." Each eye's glass contains a liquid crystal layer which has the property of becoming opaque when voltage is applied, being otherwise transparent. The glasses are controlled by a timing signal that allows the glasses to alternately block one eye, and then the other, in synchronization with the refresh rate of the screen. The timing synchronization to the video equipment may be achieved via a wired signal, or wirelessly by either an infrared or radio frequency (e.g. Bluetooth, Digital Light Process (DLP) link, etc.) transmitter. Active shutter 3D systems are used to present 3D films in some theaters, and they can be used to present 3D images on CRT, plasma, LCD and other types of video displays.

A "polarized 3D system" uses polarization glasses to create the illusion of three-dimensional images by restricting the light that reaches each eye, an example of stereoscopy. To present stereoscopic images and films, two images are projected superimposed onto the same screen or display through different polarizing filters. The viewer wears low-cost eyeglasses which contain a pair of different polarizing filters. As each filter passes only that light which is similarly polarized and blocks the light polarized in the opposite direction, each eye sees a different image. This is used to produce a three-dimensional effect by projecting the same scene into both eyes, but depicted from slightly different perspectives. Several people can view the stereoscopic images at the same time.

"Autostereoscopy" is any method of displaying stereoscopic images (adding binocular perception of 3D depth) without the use of special headgear or glasses on the part of the viewer. Because headgear is not required, it is also called "glasses-free 3D" or "glassesless 3D". There are two broad approaches currently used to accommodate motion parallax and wider viewing angles: eye-tracking, and multiple views so that the display does not need to sense where the viewers' eyes are located. Examples of autostereoscopic displays technology include lenticular lens, parallax barrier, volumetric display, holographic and light field displays.

3D Display Method

Figure 4A:
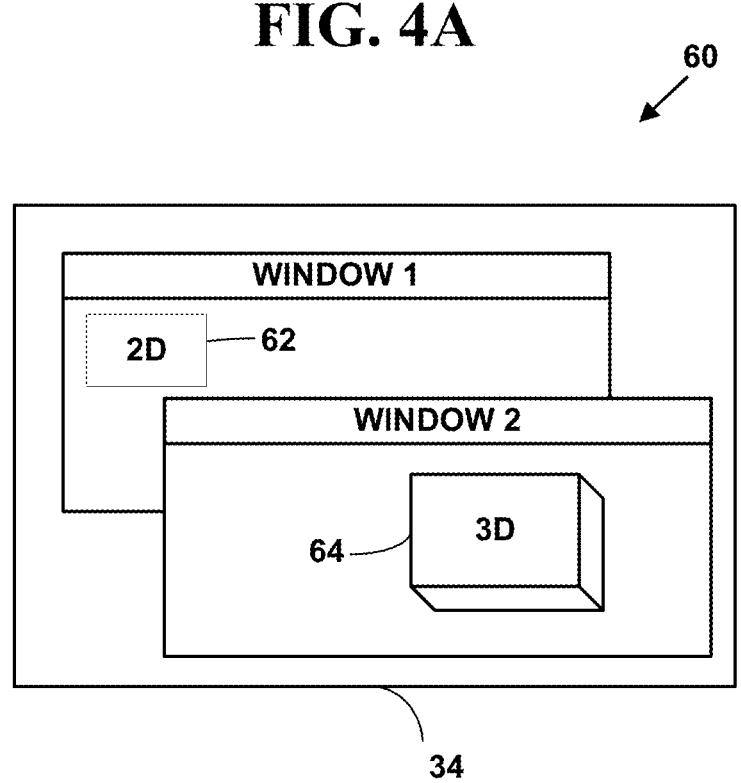
FIG. 4A is a block diagram illustrating a three-dimensional (3D) display.

FIG. 4A is a block diagram 60 illustrating a three-dimensional (3D) display.

In one embodiment, 3D electronic information is displayed in a graphical window 36, 38 in the GUI 34 on a smart phone 14 or table computer 12 or other target network device 16 or sever network device 20, 22, 24, 26 includes graphical windows with 2D 62 (e.g., FIG. 4A) and 3D 64 (e.g., FIG. 4A, etc.) graphical objects displayed and/or a combination of 2D and 3D graphical objects displayed. When the 3D graphical objects 64 are displayed on the GUI 34, they provide a more distinct graphical object that is more easily viewable and one that "pops" off the GUI 32 when viewed. The 3D objects 64 allow a viewer to more easily follow an object. In one embodiment, 3D glasses are not required or used to view the 3D graphical objects. In such an embodiment, the 3D graphical objects 64 are displayed in a specialized 3D format using a first type of 3D API.

In another embodiment, 3D glasses are used to view the 3D graphical objects 64. In such an embodiment, the 3D graphical objects 64 are displayed in a specialized 3D format using another type of 3D API. However, 3D glasses are not required to view the 3D graphical objects and the invention can be practiced without 3D glasses, the specialized 3D format or the 3D API.

For example in one embodiment with 3D glasses required, 3D stereoscopy is used. 3D stereoscopy (also called stereoscopic or 3-D imaging) is a technique capable of recording three-dimensional visual information and/or creating the illusion of depth in an image for 3D display. However, the present invention is not limited to such embodiments and 3D objects can be used without specialized 3D glasses, etc.\

Figure 4B:
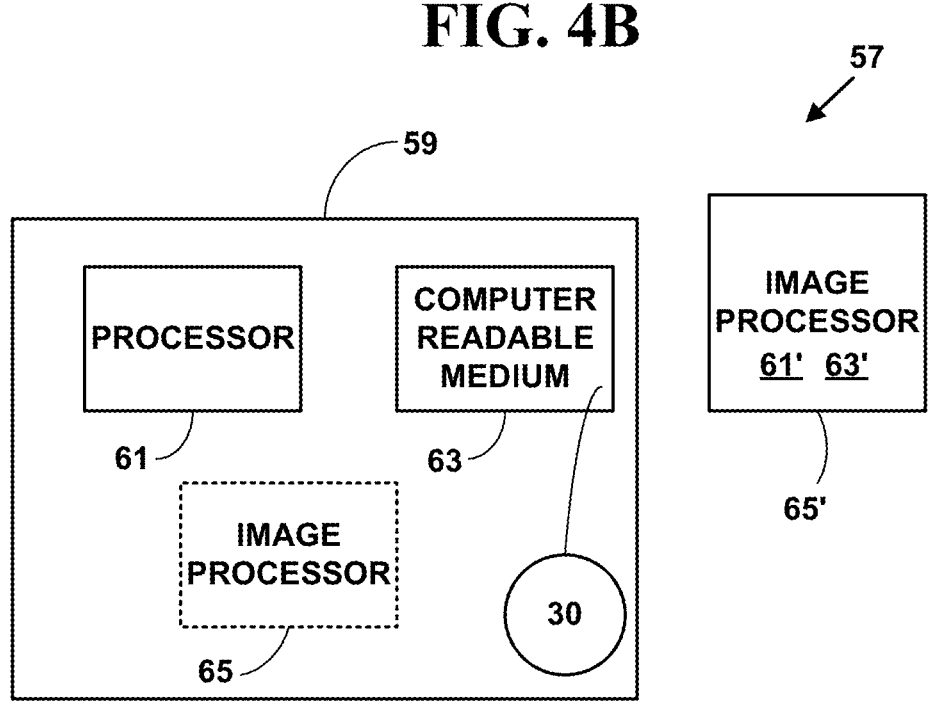
FIG. 4B is a block diagram illustrating an exemplary 3D display circuit.

FIG. 4B is a block diagram 57 illustrating an exemplary 3D display circuit 59. The circuit 59 includes one or more processors 61, a non-transitory computer readable medium 63 and is configured for displaying three-dimensional (3D) information. In one embodiment the network device 12, 14, 16 includes an image processor 65. In another embodiment, the electronic circuit 59 is replaced with an integrated image processor 65' with integral one or more processors 61' and integral non-transitory computer readable medium 63'. However, the present invention is not limited to this embodiment and more, fewer and/or other components can be used to practice the invention.

FIG. 5 is a flow diagram illustrating a Method 66 for 3D display. At Step 68, a selection input is received on an electronic circuit configured for displaying three-dimensional (3D) information on a network device with one or more processors to display on a display component on the network device a selected set of 2D display cells (x, y) in a 2D image as 3D display cells (x, y, z) in a 3D image. The electronic circuit checks whether the received 2D image content has a reference to a vector space that can be used for 3D display. At Step 70, the electronic circuit selects from a non-transitory computer readable medium on the network device the selected set of plural two-dimensional (2D) display cells (x, y) in a 2D plane in a Cartesian coordinate plane including an x-axis and a y-axis. At Step 72, the electronic circuit creates plural 3D display cells (x, y, z) each with a (x, y and z) axis by adding to each of the selected set of 2D display cells (x, y), plural z-axis including a plurality of variable depth of source data through virtual length light. At Step 74, the electronic circuit changes a length of one or more of the variable virtual light sources for selected ones of the created plural 3D display cells (x, y, z) by changing selected data in the plural variable virtual length light source data. At Step 76, the electronic circuit alters the 2D image at (x, y) along a 3D z-axis (x, y, $z_\alpha$) at a viewing angle ($\alpha$) to create a converted 3D image for viewing on the display component on the network device. At Step 78, the electronic circuit displays the converted 3D image on the display component of the network device.

Figure 6:
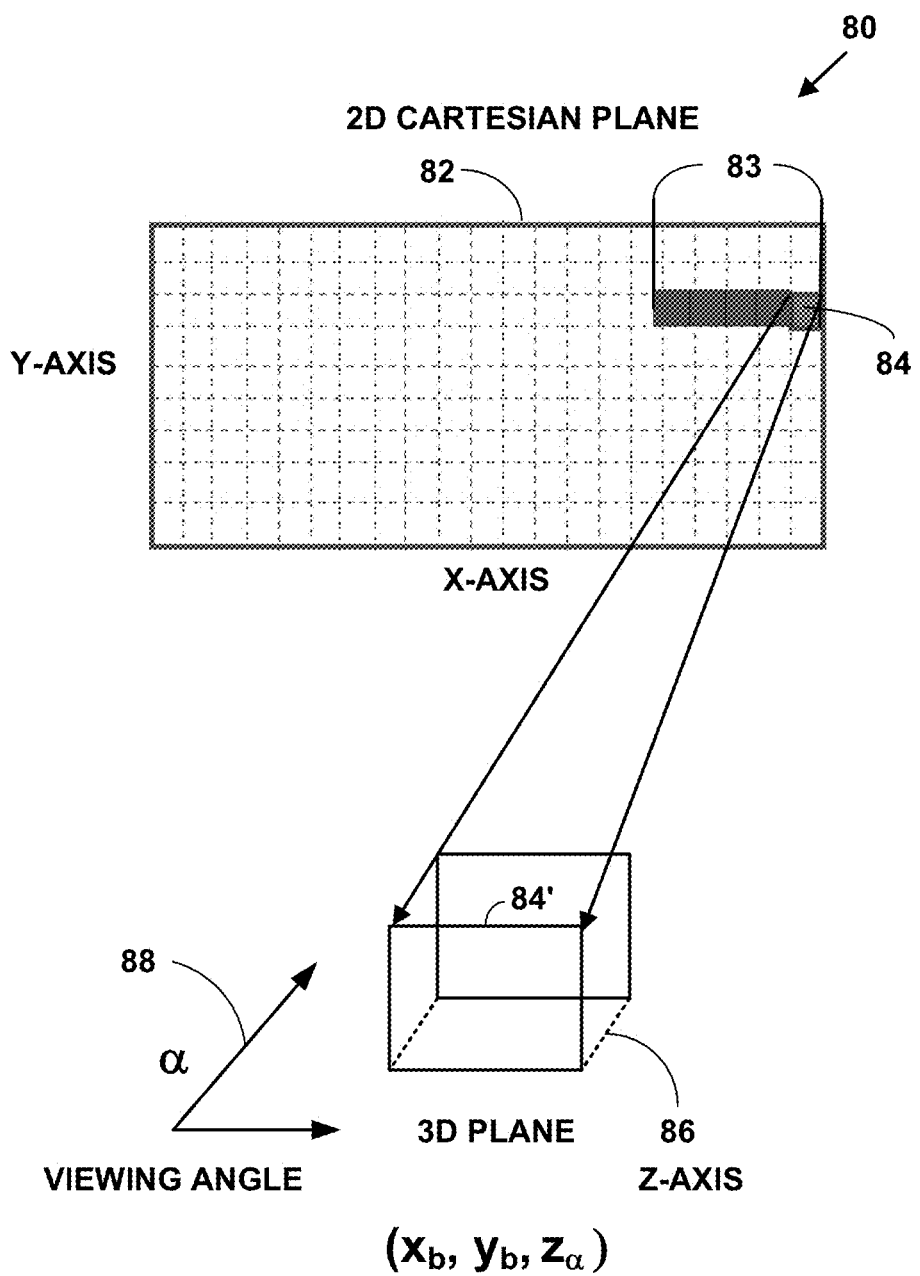
FIG. 6 is a block diagram illustrating a 3D display using the method of FIG. 5.

FIG. 6 is a block diagram 80 illustrating a 3D display using Method 66.

Returning to FIG. 5, Method 66 is illustrated with one exemplary embodiment. However, the present invention is not limited to such an embodiment and other embodiments can also be used to practice the invention.

In such an exemplary embodiment at Step 68, a selection input is received on an electronic circuit 59 configured for displaying three-dimensional (3D) information on a network device 12, 14, 16, 102-110, with one or more processors, to display on a display component 32 on the network device a selected set 83 of 2D display cells (x, y) 84 in a 2D image 62 as 3D display cells (x, y, z) 88 in a 3D image 64.

In one application, the electronic circuit 59 includes application 30 executing in the non-transitory computer readable medium 63. In another embodiment the functionality of application 30 is integral to electronic circuit 59 and a separate application 30 is not used. However, the present invention is not limited to such embodiments and other embodiments can also be used to practice the invention.

In one embodiment, the electronic circuit 59 includes an image processor 65. In another embodiment, an integrated image processor 65 with one or more internal processors 61 and internal computer readable medium 63 replaces the electronic circuit 59. However, the present invention is not limited to such embodiments and other embodiments can also be used to practice the invention.

An image processor 65, image processing engine, also called media processor, is a specialized digital signal processor used for image processing in digital cameras, mobile phones or other devices. Often it is a system on a chip with multi-processor/multi-core processor architecture, using parallel computing even with Single Instruction Multiple Data (SIMD) or Multiple Instruction Multiple Data (MIMD) technologies to increase speed and efficiency. However, the present invention is not limited to this embodiment and other embodiments can be used to practice the invention with or without an image processor.

At Step 70, the electronic circuit 59 selects from a non-transitory computer readable medium 63 on the network device 12, 14, 16, 102-110 the selected set 83 of plural two-dimensional (2D) display cells (x, y) (e.g., individual 2D display cell 84, etc.) in a 2D plane in a Cartesian coordinate plane 82 including an x-axis and a y-axis.

"A Cartesian coordinate system" is a coordinate system that specifies each point uniquely in a plane 82 by a pair of numerical coordinates, which are the signed distances from the point to two fixed perpendicular directed lines, measured in the same unit of length. Each reference line is called a coordinate axis or just axis of the system, and the point where they meet is its origin, usually at ordered pair (0,0). The coordinates can also be defined as the positions of the perpendicular projections of the point onto the two axes, expressed as signed distances from the origin.

The same principle is used to specify the position of any point in three-dimensional (3D) space by three Cartesian coordinates, its signed distances to three mutually perpendicular planes (or, equivalently, by its perpendicular projection onto three mutually perpendicular lines). In general, n Cartesian coordinates (an element of real n-space) specify the point in an n-dimensional Euclidean space for any dimension n. These coordinates are equal, up to sign, to distances from the point to n mutually perpendicular hyperplanes. "Euclidean space" encompasses a Euclidean plane and the three-dimensional space of Euclidean geometry as spaces of dimensions 2 and 3 respectively.

Using a Cartesian coordinate system for a 3D space includes choosing an ordered triplet of lines (axes), any two of them being perpendicular; a single unit of length for all three axes; and an orientation for each axis. As in the 2D case, each axis becomes a number line. The coordinates of a point pare obtained by drawing a line through p perpendicular to each coordinate axis, and reading the points where these lines meet the axes as three numbers of these number lines.

Alternatively, the coordinates of a point p can also be taken as the (signed) distances from p to the three planes defined by the three axes. If the axes are named x, y, and z, then the x coordinate is the distance from the plane defined by the y and z axes. The distance is to be taken with the + or − sign, depending on which of the two half-spaces separated by that plane contains p. The y and z coordinates can be obtained in the same way from the (x, z) and (x, y) planes, respectively.

At Step 72, the electronic circuit 59 creates plural 3D display cells 84' (x, y, z) each with a (x, y and z) axis (only one of which is illustrated for simplicity) by adding to each of the selected set 83 of 2D display cells (x, y) 84, plural z-axis 86 (only one of which is illustrated for simplicity) including plural variable virtual length light source data.

At Step 74, the electronic circuit 59 changes a length of one or more of the variable virtual light sources for selected ones of the created plural 3D display cells 84' (x, y, z) by changing selected data in the plural variable virtual length light source data 86.

In one embodiment, a virtual 3D (z-axis) 86 is moved on the plural cells 84' which represent the Cartesian 2D coordinate plane 82 allowing a 2D 62 image at exemplary sample cell $(x_a, y_a)$ to move along the virtual z-axis 86 to appear as though there is an actual distance (z) as is illustrated in Equation (1). However, the present invention is not limited to this embodiment and other embodiments can be used to practice the invention.

$$\begin{pmatrix} x_a \\ y_a \\ y_a \\ 0 \end{pmatrix}, \begin{pmatrix} x_a \\ y_a \\ z_1 \\ \alpha_1 \end{pmatrix}, \begin{pmatrix} x_a \\ y_a \\ z_2 \\ \alpha_2 \end{pmatrix} \ldots \begin{pmatrix} x_a \\ y_a \\ z_n \\ \alpha_n \end{pmatrix} \quad (1)$$

The added distance (z) 86 is variable data created from a light source and (α) a viewing angle 88 that is automatically adjusted automatically depending on a viewing location and viewing angle 88 of a viewer. The same equation is used for sample cells b, c, d, etc., $(x_b, y_b)$, $(x_c, y_c)$, $(x_d, y_d)$, etc.

At Step 76, the electronic circuit 59 alters the 2D image 62 at (x, y) along a 3D z-axis $(x, y, z_\alpha)$ 86 at a viewing angle (α) 88 to create a converted 3D image 64 for viewing on the display component 32 on the network device 12, 14, 16, 102-110.

In one embodiment, a length of a $3^{rd}$ dimension is controlled by an image processor 65 which has prior knowledge of the actual object locations in a 2D image 62. That in turn controls spatial-time to create a visual 3D depth of the 2D objects. However, the present invention is not limited to this embodiment and other embodiments can be used to practice the invention.

At Step 78, the electronic circuit 59 displays the converted 3D image 62 on the display component 32 of the network device 12, 14, 16, 102-110.

Figure 7:
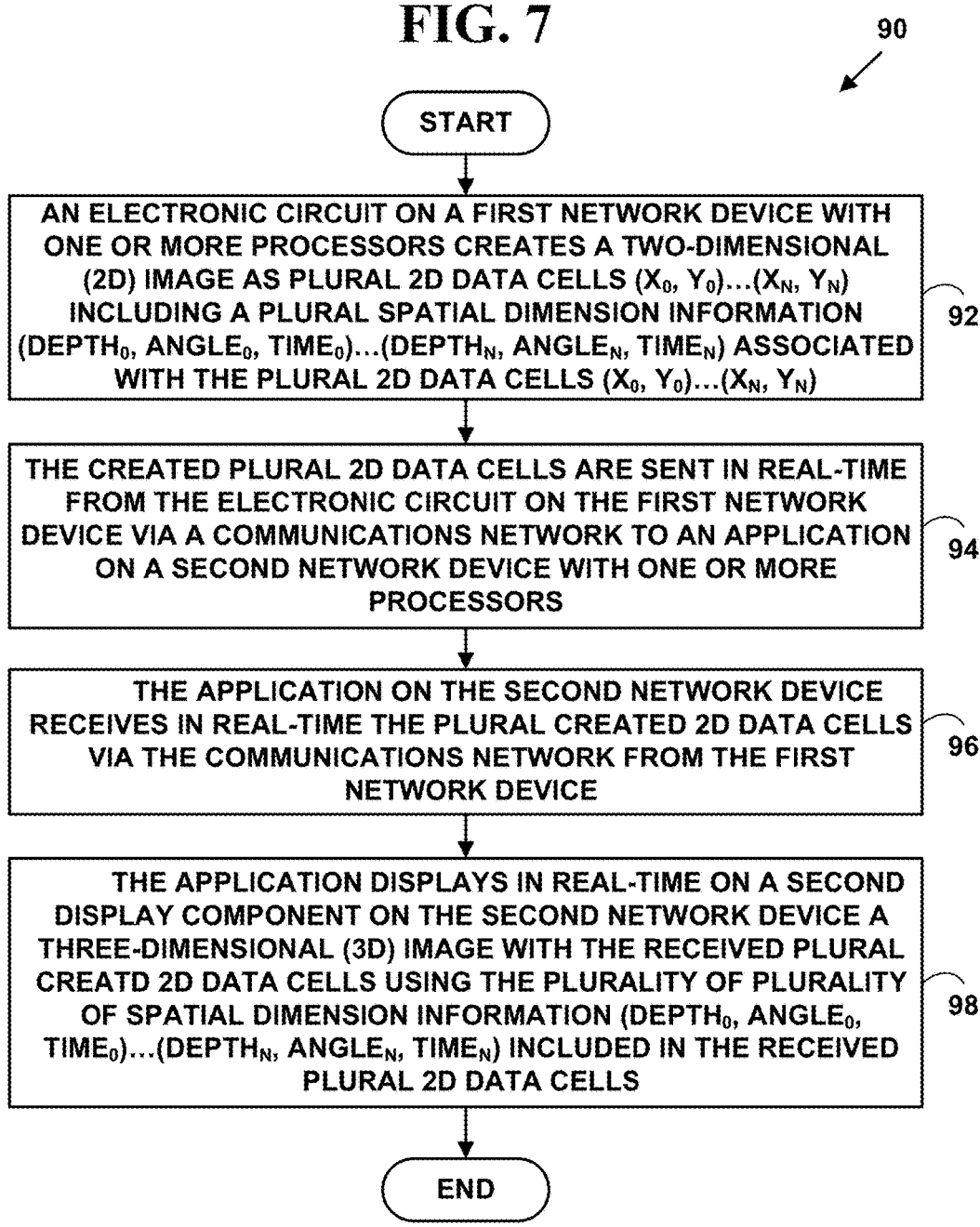
FIG. 7 is a flow diagram illustrating a method for 3D display.

FIG. 7 is a flow diagram illustrating a Method 90 for 3D display. At Step 92, an electronic circuit on a first network device with one or more processors creates a two-dimensional (2D) image as plural 2D data cells $(x_0, y_0) \ldots (x_n, y_n)$ including plural spatial dimension information $(depth_0, angle_0, time_0) \ldots (depth_n, angle_n, time_n)$ associated with the plural 2D data cells $(x_0, y_0) \ldots (x_n, y_n)$. At Step 94, the plural created 2D data cells are sent in real-time from the electronic circuit on the first network device via a communications network to an application on a second network device with one or more processors. At Step 96, the application on the second network device receives in real-time the plural created 2D data cells via the communications network from the first network device. At Step 98, the application displays in real-time on a second display component on the second network device a three-dimensional (3D) image with the received plural created 2D data cells using the plural spatial dimension information $(depth_0, angle_0, time_0) \ldots (depth_n, angle_n, time_n)$ included in the received plural created 2D data cells.

Method 90 is illustrated with one exemplary embodiment. However, the present invention is not limited to such an embodiment and other embodiments can also be used to practice the invention.

In such an exemplary embodiment, at Step 92, an electronic circuit 59 on a first network device 12, 14, 16, 102-110 with one or more processors creates in real-time (i.e., within a second or less in time after an event, etc.) a two-dimensional (2D) image 62 as plural 2D data cells $(x_0, y_0) \ldots (x_n, y_n)$ 84' (only one of which is illustrated for simplicity) including plural spatial dimension information with depth 86, angle 88 and time as $(depth_0, angle_0, time_0) \ldots (depth_n, angle_n, time_n)$ associated with the plural 2D data cells 84' $(x_0, y_0) \ldots (x_n, y_n)$. This spatial dimension information is called a "space vector." However, the present invention is not limited to such an embodiment and other embodiments can also be used to practice the invention.

At Step 94, the plural created 2D data cells 84' are sent in real-time from the electronic circuit 59 on the first network device 12, 14, 16, 102-110 via a communications network 18 to an application 30 on a second network device 12, 14, 16, 102-110 with one or more processors.

At Step 96, the application 30, 30' on the second network device 12, 14, 16, 20, 22, 24, 26, 102-110 receives in real-time the plural created 2D data cells 84' via the communications network 18 from the first network device 12, 14, 16, 20, 22, 24, 26 102-110

At Step 98, the application 30, 30' displays in real-time on a second display component 34 on the second network device 12, 14, 16, 20, 22, 24, 26, 102-110 a three-dimensional (3D) image 64 with the received plural created 2D data cells 84' using the plural spatial dimension information 86, 88 from zero-to-n $(depth_0, angle_0, time_0) \ldots (depth_n, angle_n, time_n)$ included in the received plural created 2D data cells 84'.

In one embodiment, the application 30, 30' displays at a later time (i.e., non-real-time, etc.) on a second display component 34 on the second network device 12, 14, 16 20, 22, 24, 26, 102-110 a three-dimensional (3D) image 64 with the received plural created 2D data cells 84' using the plural spatial dimension information 86, 88 $(depth_0, angle_0, time_0) \ldots (depth_n, angle_n, time_n)$ included in the received plural created 2D data cells 84'. However, the present invention is not limited to this embodiment and other embodiments can be used to practice the invention.

In one embodiment, the electronic circuit 59 via the first network device 12, 14, 16, 102-110, via the communications network 18 displays in real-time and/or at a later time a three-dimensional (3D) image with the plural created 2D data cells 84' using the plural spatial dimension information 86, 88, (depth$_0$, angle$_0$, time$_0$) . . . (depth$_n$, angle$_n$, time$_n$) included in the created plural 2D data cells 84' on television services 26 including Internet television, Web-TV, Internet Protocol Television (IPtv) or broadcast television services 26, social networking services 24, 27 or search engine services 22. However, the present invention is not limited to this embodiment and other embodiments can be used to practice the invention.

In one embodiment, the 3D viewing device (i.e., second network device, etc.) utilizes an actual light source and/or a virtual light source to manage the 3D spatial effect to display the 3D image 64. The actual and/or virtual light source is created by, but not limited to: liquid-crystal display (LCD), Light-emitting diode (LED), Organic LED (OLED), and/or optical source such as Laser and Infrared, etc. However, the present invention is not limited to this embodiment and other embodiments can be used to practice the invention.

In one embodiment, the electronic circuit 59 displays in real-time or at a later time on a first display component 34 on the first network device 12, 14, 16, 102-110 the three-dimensional (3D) image 64 with the plural created 2D data cells 84' using the plural spatial dimension information 86, 88 (depth$_0$, angle$_0$, time$_0$) . . . (depth$_n$, angle$_n$, time$_n$) included in the created plurality of 2D data cells 84'. However, the present invention is not limited to this embodiment and other embodiments can be used to practice the invention.

Wearable Devices

Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information, Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, etc. activities.

Digital eyewear, such as GOOGLE Glass, Smart watches by SONY, NIKE, GARMIN, SAMSUNG, wrist bands and/or fitness bands by LG, NIKE, FITBIT, etc. and others are examples of wearable mobile devices. Just like mobile and non-mobiles phones, a current physical location of such wearable mobile devices must be determine in an emergency situation.

Figure 8:
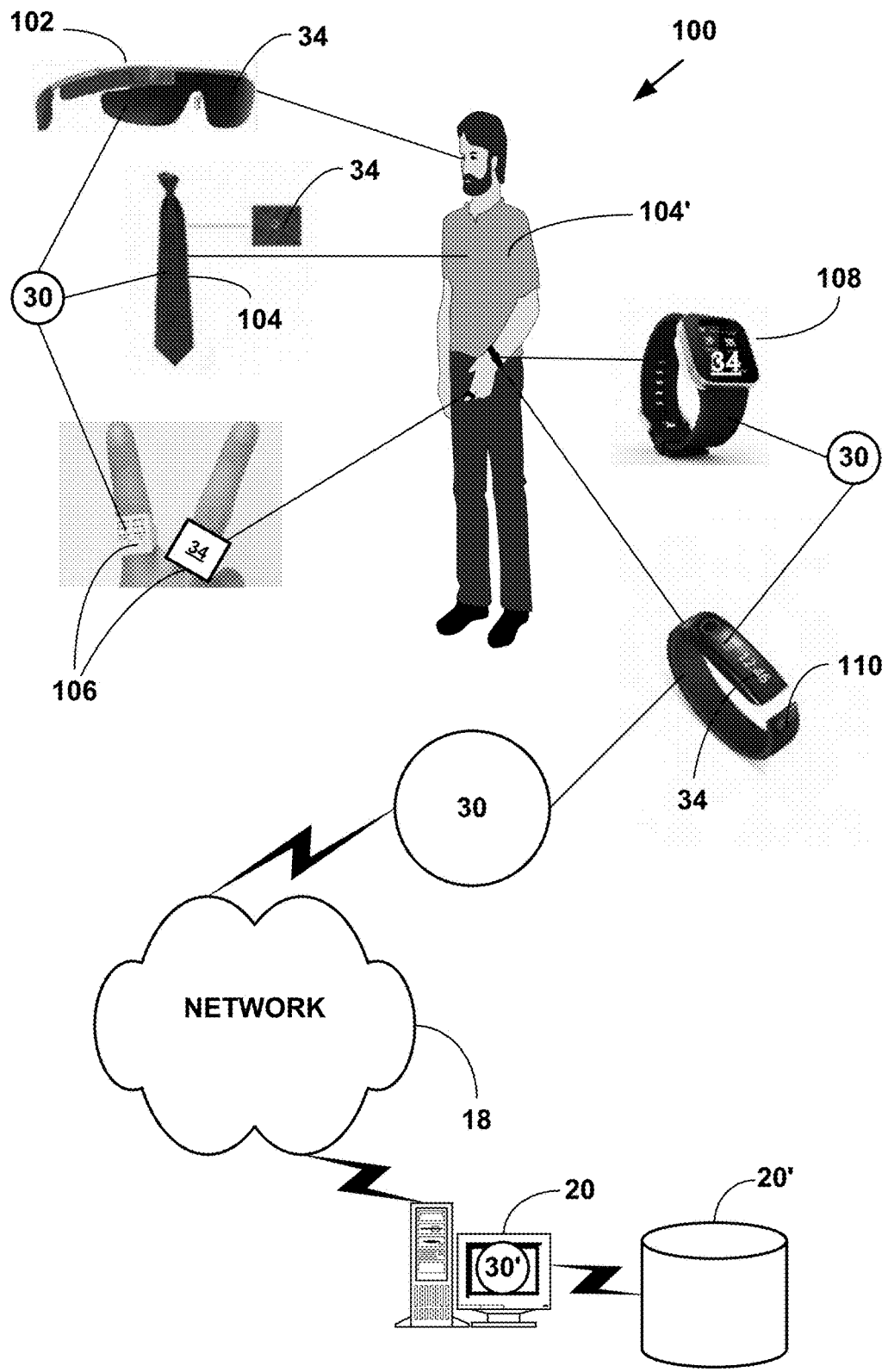
FIG. 8 is a block diagram illustrating exemplary wearable network devices.

FIG. 8 is a block diagram 100 illustrating exemplary wearable devices. The wearable devices include one or more processors and include, but are not limited to, wearable digital glasses 102 (e.g., GOOGLE Glass, etc.), clothing 104 (e.g., smart ties 104', smart headwear, etc.), jewelry 106 (e.g., smart rings, smart earrings, etc.), watches 108 (e.g., SONY, NIKE, SAMSUNG, NIKE, GARMIN, etc.) and/or wrist bands or fitness bands 110 (e.g. GARMIN, FITBIT, POLAR, NIKE, JAWBONE, LG, etc.). The wearable mobile devices 102-110 includes application 30. All of the wearable devices 102-110 have one or more processors and/or selected ones have other components including, but not limited to, accelerometers, altimeters, music control, phone compatibility, etc. However, the present invention is not limited to such embodiments and more, fewer and other types of wearable devices can also be used to practice the invention.

Methods 66 and 90 allow any ordinary recording device such as a camera, smart phone, tablet, set-top box, game counsel, etc., which shoots a 2D image, to add a correlation with a spatial dimension (depth 86, angle 88, time). In one embodiment, the output of the recording device has a format of a digital packet which encapsulates the digitized 2D image along with its correlated spatial signal for transmission over any communications network to any digital media on another network device. An application 30 at the 3D viewing device recognizes and parses the received 3D packets through manipulating the 2D content along with its spatial and time reference to create the converted 3D image. The application 30 is not needed for 2D display. However, the present invention is not limited to these embodiments and other embodiments can be used to practice the invention.

The present invention can be used for 3D display of 2D information without additional devices such as 3D glasses, etc. The 3D information includes movies and games on smart phones, TV, computers, table computers and hand-helds, and other devices, It can also be used for display of 3D images of real-world objects: clothes, shoes, kitchen appliance, machinery, human body, physical structures, etc., for a virtual-fitting-room, virtual-touch prior purchasing items from web stores, virtual communication and interaction with 3D image representative of people, Virtual environment for learning, training, touring, gaming, entertaining and for many other uses.

In addition, the present invention allows 3D TV, movie and game services, without a 3D set top box/DVR in order to receive 3D programming. The present invention eliminates the need for both 3D glasses and 3D set top boxes for consumers to receive 3D programming and/or 3D information.

It should be understood that the architecture, programs, processes, methods and It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software via one or more processors, in other embodiments, hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A method for three-dimensional (3D) display of two-dimensional (2D) information comprising:

receiving a selection input, on an electronic circuit configured for displaying three-dimensional (3D) information on a network device with one or more processors, to display on a display component on the network device a selected set of two-dimensional (2D) display cells (x, y) in a 2D image as 3D display cells (x, y, z) in a 3D image;

selecting from the electronic circuit from a non-transitory computer readable medium on the network device the selected set of plurality of 2D display cells (x, y) in a 2D plane a Cartesian coordinate plane including an x-axis and a y-axis;

creating from the electronic circuit a plurality of 3D display cells (x, y, z) with a (x, y and z) axis by adding to each of the selected set of 2D display cells (x, y), a plurality of z-axis including a plurality of variable length virtual light source data including a viewing angle and a viewing location along a virtual z-axis for each (x, y) cell in the selected set of 2D display cells (x, y) to appear as though there is a viewing angle and a viewing location along an actual z-axis from an actual light source for an actual 3D image;

adding a plurality of space vectors to the plurality of z-axis including a plurality of spatial dimension information comprising depth, angle and time information from a first point (zero) to a second point (n), the depth, angle and time information included as ($depth_0$, $angle_0$, $time_0$) . . . ($depth_n$, $angle_n$, $time_n$) associated with the selected set of 2D display cells ($x_0$, $y_0$) . . . ($x_n$, $y_n$) thereby allowing viewing of the created plurality of 3D display cells (x, y, z) on the network device without any additional external 3D viewing devices;

changing from the electronic circuit a length of one or more of the variable virtual light sources for selected ones of the created plurality of 3D display cells (x, y, z) by changing selected data in the plurality of variable length virtual light source data;

altering from the electronic circuit the 2D image at (x, y) along a 3D z-axis (x, y, $z_\alpha$) at a viewing angle ($\alpha$) to create a converted 3D image for viewing on the display component on the network device; and displaying in real-time from the electronic circuit the converted 3D image on the display component of the network device.

2. The method of claim 1 wherein the receiving step includes receiving the selection input on an application on the electronic circuit.

3. The method of claim 1 wherein the electronic circuit includes an integrated image processor.

4. The method of claim 1 wherein the electronic circuit is replaced with an integrated image processor.

5. The method of claim 1 wherein the creating step further comprises:

moving a virtual 3D (z-axis) a pre-determined distance on the selected set of plurality of two-dimensional (2D) display cells (x, y) in the 2D plane in the Cartesian coordinate plane thereby allowing the 2D image at exemplary 2D cell ($x_a$, $y_a$) to move along the virtual 3D (z-axis) from a first point (zero) to a second point (n) to appear as though there is an actual distance (z) in an exemplary 3D cell ($x_a$, $y_a$, $z_1$), as is illustrated in:

$$\begin{pmatrix} x_a \\ y_a \\ 0 \end{pmatrix}, \begin{pmatrix} x_a \\ y_a \\ z_1 \\ \alpha_1 \end{pmatrix}, \begin{pmatrix} x_a \\ y_a \\ z_2 \\ \alpha_2 \end{pmatrix} \ldots \begin{pmatrix} x_a \\ y_a \\ z_n \\ \alpha_n \end{pmatrix},$$

wherein $\alpha_1$ to $\alpha_n$ is a corresponding viewing angle.

6. The method of claim 1 wherein the network device includes, multimedia capable desktop and laptop computers, tablet computers, mobile phones, non-mobile phones, smart phones, wearable devices, Internet phones, Internet appliances, personal digital-data assistants (PDA), digital cameras, digital video cameras, portable game consoles, non-portable game consoles, cable television (CATV) set-top boxes, digital televisions including high definition television (HDTV) or a 3D printer.

7. The method of claim 1 further comprising a communications network.

8. The method of claim 7 wherein the communications network is a wireless communications network comprising an IEEE 802.11a, 802.11b, 802.11g, 802.11n, 802.15.4 (Zig-Bee), Wireless Fidelity (Wi-Fi), Cellular Networks, Worldwide Interoperability for Microwave Access (WiMAX), ETSI High Performance Radio Metropolitan Area Network (HIPERMAN), RF Home, Bluetooth, an infrared data association (IrDA), Near Field Communications (NFC), or Machine-to-Machine (M2M) wireless communications network or a wired communications network.

9. The method of claim 7 further comprising:

sending the converted 3D image from the electronic circuit on the network device via the communications network to second network device with one or more processors for display on a second display component on the second network device.

10. The method of claim 1 further comprising:

creating on an electronic circuit on a first network device with one or more processors a two-dimensional (2D) image including a first point (zero) to a second point (n) as a plurality of 2D data cells ($x_0$, $y_0$) . . . ($x_n$, $y_n$) including a plurality of spatial dimension information ($depth_0$, $angle_0$, $time_0$) . . . ($depth_n$, $angle_n$, $time_n$) associated with the plurality of 2D data cells ($x_0$, $y_0$) . . . ($x_n$, $y_n$);

sending in real-time the plurality of created 2D data cells from the electronic circuit on the first network device via a communications network to an application on a second network device with one or more processors;

receiving in real-time on the application on the second network device the plurality of created 2D data cells via the communications network from the first network device; and displaying in real-time via the application on a second display component on the second network device a three-dimensional (3D) image with the received plurality of created 2D data cells using the plurality of spatial dimension information ($depth_0$, $angle_0$, $time_0$) . . . ($depth_n$, $angle_n$, $time_n$) included in the received plurality of created 2D data cells.

11. The method of claim 10 wherein the communications network is a wireless communications network comprising an IEEE 802.11a, 802.11b, 802.11g, 802.11n, 802.15.4 (Zig-Bee), Wireless Fidelity (Wi-Fi), Cellular Networks, Worldwide Interoperability for Microwave Access (WiMAX), ETSI High Performance Radio Metropolitan Area Network (HIPERMAN), RF Home, Bluetooth, an infra data association (IrDA), Near Field Communications (NFC), or Machine-to-Machine (M2M) wireless network or a wired communications network.

12. The method of claim 10 wherein the first network device and the second network device include: multimedia capable desktop or laptop computers, tablet computers, mobile phones, non-mobile phones, smart phones, wearable devices, Internet phones, Internet appliances, personal digital-data assistants (PDA), digital cameras, digital video cameras, portable game consoles, non-portable game consoles, cable television (CATV) set-top boxes, digital televisions including high definition television (HDTV) or a 3D printer.

13. The method of claim 10 further comprising:
displaying in real-time or at a later time via the electronic circuit on a first display component on the first network device a three-dimensional (3D) image with the plurality of created 2D data cells using the plurality of spatial dimension information ($depth_0$, $angle_0$, $time_0$) . . . ($depth_n$, $angle_n$, $time_n$) included in the created plurality of 2D data cells.

14. The method of claim 10 further comprising:
utilizing on the application a light source to manage display of the 3D image on the second display component.

15. The method of claim 14 wherein the light source includes an actual or virtual light source including actual or virtual light from a liquid-crystal display (LCD), Light-emitting diode (LED), an Organic LED (OLED), a Laser or an Infrared light source.

16. The method of claim 10 further comprising:
displaying at a later time via the application on a second display component on the second network device a three-dimensional (3D) image with the received plurality of created 2D data cells using the plurality of spatial dimension information ($depth_0$, $angle_0$, $time_0$) . . . ($depth_n$, $angle_n$, $time_n$) included in the received plurality of created 2D data cells.

17. The method of claim 10 further comprising:
displaying in real-time or at a later time via the electronic circuit via the first network device via the communications network a three-dimensional (3D) image with the plurality of created 2D data cells using the plurality of spatial dimension information ($depth_0$, $angle_0$, $time_0$) . . . ($depth_n$, $angle_n$, $time_n$) included in the created plurality of 2D data cells on television services including Internet television, Web-TV, Internet Protocol Television (IPtv) or broadcast television services, social networking services or search engine services.

18. A system for three-dimensional (3D) display of two-dimensional (2D) information comprising in combination:
one or more two-dimensional (2D) images stored in one or more non-transitory computer readable mediums on one or more network devices each with one or more processors;
the one or more network devices including one or more display components for displaying 2D images and three-dimensional (3D) images;
the one or more processors on the one or more network devices configured for:
for receiving a selection input, on an electronic circuit configured for displaying three-dimensional (3D) information on a network device with one or more processors, to display on a display component on the network device a selected set of two-dimensional (2D) display cells (x, y) in a 2D image as 3D display cells (x, y, z) in a 3D image;

for selecting from the electronic circuit from a non-transitory computer readable medium on the network device the selected set of plurality of 2D display cells (x, y) in a 2D plane a Cartesian coordinate plane including an x-axis and a y-axis;

for creating from the electronic circuit a plurality of 3D display cells (x, y, z) with a (x, y and z) axis by adding to each of the selected set of 2D display cells (x, y), a plurality of z-axis including a plurality of variable length virtual light source data including a viewing angle and a viewing location along a virtual z-axis for each (x, y) cell in the selected set of 2D display cells (x, y) to appear as though there is a viewing angle and a viewing location along an actual z-axis from an actual light source for an actual 3D image;

for adding a plurality of space vectors to the plurality of z-axis including a plurality of spatial dimension information comprising depth, angle and time information from a first point (zero) to a second point (n), the depth, angle and time information included as ($depth_0$, $angle_0$, $time_0$) . . . ($depth_n$, $angle_n$, $time_n$) associated with the selected set of 2D display cells ($x_0$, $y_0$) . . . ($x_n$, $y_n$) thereby allowing viewing of the created plurality of 3D display cells (x, y, z) on the network device without any additional external 3D viewing devices;

for changing from the electronic circuit a length of one or more of the variable virtual light sources for selected ones of the created plurality of 3D display cells (x, y, z) by changing selected data in the plurality of variable length virtual light source data;

for altering from the electronic circuit the 2D image at (x, y) along a 3D z-axis (x, y, $z_\alpha$) at a viewing angle ($\alpha$) to create a converted 3D image for viewing on the display component on the network device; and for displaying in real-time from the electronic circuit the converted 3D image on the display component of the network device.

19. The system of claim 18 further comprising a communications network.

20. The system of claim 18 further comprising:
for sending the converted 3D image from the electronic circuit on the network device via the communications network to second network device with one or more processors for display on a second display component on the second network device;
for creating on the electronic circuit on the network device a two-dimensional (2D) image as a plurality of 2D data cells ($x_0$, $y_0$) . . . ($x_n$, $y_n$) including a plurality of spatial dimension information ($depth_0$, $angle_0$, $time_0$) . . . ($depth_n$, $angle_n$, $time_n$) associated with the plurality of 2D data cells ($x_0$, $y_0$) . . . ($x_n$, $y_n$);
for sending in real-time the plurality of created 2D data cells from the electronic circuit on the network device via the communications network to an application on a second network device with one or more processors;
for receiving in real-time on the application on the second network device the plurality of created 2D data cells via the communications network from the first network device;
for displaying in real-time or at a later time via the application on a second display component on the second network device a three-dimensional (3D) image with the received plurality of created 2D data cells using the plurality of spatial dimension information ($depth_0$, $angle_0$, $time_0$) . . . ($depth_n$, $angle_n$, $time_n$) included in the received plurality of created 2D data cells; and for displaying in real-time or at a later time via the electronic circuit via the network device via the communications network a three-dimensional (3D) image with the plurality of created 2D data cells using the plurality of spatial dimension information ($depth_0$, $angle_0$, $time_0$) . . . ($depth_n$, $angle_n$, $time_n$) included in the created plurality of 2D data cells on a display component on the network device or on television services including Internet television, Web-TV, Internet Protocol Television (IPtv) or broadcast television services, social networking services or search engine services.

* * * * *